United States Patent
Sarda et al.

(10) Patent No.: US 9,619,835 B1
(45) Date of Patent: Apr. 11, 2017

(54) PRODUCT CUSTOMIZATION OFFERINGS

(75) Inventors: Ajay Kumar Sarda, Abdhra Pradesh (IN); Ankur Singla, Hyderabad (IN); Atul Aggarwal, Delhi (IN); Vincent M. Rohr, Woodinville, WA (US); Manish Ramesh Bhatia, Maharashtra (IN)

(73) Assignee: Amazon Technologies, Inc., Seattle, WA (US)

( * ) Notice: Subject to any disclaimer, the term of this patent is extended or adjusted under 35 U.S.C. 154(b) by 544 days.

(21) Appl. No.: 13/297,685

(22) Filed: Nov. 16, 2011

(51) Int. Cl.
*G06Q 30/00* (2012.01)
*G06Q 30/06* (2012.01)

(52) U.S. Cl.
CPC ......... *G06Q 30/0641* (2013.01); *G06Q 30/06* (2013.01)

(58) Field of Classification Search
CPC .......................................... G06Q 30/00–30/08
USPC ............................................... 705/26.1–27.2
See application file for complete search history.

(56) References Cited

U.S. PATENT DOCUMENTS

| | | | |
|---|---|---|---|
| 2003/0033218 A1* | 2/2003 | Flaxer et al. | 705/27 |
| 2009/0216660 A1* | 8/2009 | Westphal | 705/27 |
| 2012/0221429 A1* | 8/2012 | Verchere | 705/26.5 |
| 2013/0145319 A1* | 6/2013 | Wein et al. | 715/811 |

OTHER PUBLICATIONS

"Internet firm offers templates to build Web sites." Doster, Laura. Real Estate Finance Today; Feb. 8, 1999; 16, 5; ProQuest Central.*

* cited by examiner

*Primary Examiner* — Michael Misiaszek
(74) *Attorney, Agent, or Firm* — Thomas | Horstemeyer, LLP

(57) ABSTRACT

Disclosed are various embodiments for adding product customization offerings to a product catalog. One such embodiment comprises receiving a request to create a product customization attribute for a product entry in a product catalog; generating the product customization attribute from at least one option selected on a product customization attribute template specific to a product category associated with the product entry; and directing storage of the product customization attribute associated with the product catalog entry.

20 Claims, 11 Drawing Sheets

Catalog View

Data

| NAME | POLO SHIRT |
| CATEGORY | MEN SHORT SLEEVE CASUAL SHIRT |
| MSRP | $15.99 |
| LIST PRICE | $15.50 |
| CURRENT PRICE | $13.50 |
| MANUFACTURER | WIDGET CO |

| COLOR | SIZE | STOCK QUANTITY | SKU |
|---|---|---|---|
| RED | MEDIUM | 913 | 343DSE4356AR |
| BLUE | LARGE | 99 | 343DSE4356AB |

⊕ Add Product Customization Attribute to Catalog

PRODUCT CUSTOMIZATION OFFERINGS
Inventors: Ajay Kumar Sarda, Ankur Singla, Atul Aggarwal, Vincent M. Rohr, Manish Ramesh Bhatia
Attorney Docket Number: 170106-1430

3/11

Catalog Entry  Data  /301

| NAME | POLO SHIRT |
|---|---|
| CATEGORY | MEN SHORT SLEEVE CASUAL SHIRT |
| MSRP | $15.99 |
| LIST PRICE | $15.50 |
| CURRENT PRICE | $13.50 |
| MANUFACTURER | WIDGET CO |

| COLOR | SIZE | STOCK QUANTITY | SKU |
|---|---|---|---|
| RED | MEDIUM | 913 | 343DSE4356AR |
| BLUE | LARGE | 99 | 343DSE4356AB |

⊖ Add Product Customization Attribute to Catalog

Copy a Previous Product Customization Attribute  302
    Attribute Name [           ⇕]
OR
Create a New Product Customization Attribute Attribute Name                304
[ Select a Custom Logo                    ]
Select Type of Customization  305
    Type [ CUSTOM LOGO ⇕]

Select Possible Locations                303
                      G1   G2   G3
    Right Sleeve      ☒    ☐    ☐
    Left Sleeve       ☒    ☐    ☐
    Both Sleeves      ☒    ☐    ☐
    Shirt Pocket      ☐    ☒    ☐
    Collar            ☐    ☐    ☐
    Shirt Tag         ☐    ☐    ☐
    Right Side        ☐    ☒    ☐
    Left Side         ☐    ☐    ☐
    Front             ☐    ☐    ☐
    Back              ☐    ☐    ☐
                   ○ And  ○ And
                   ◉ Or   ○ Or ( Next )

Catalog Entry — Data

| | |
|---|---|
| NAME | POLO SHIRT |
| CATEGORY | MEN SHORT SLEEVE CASUAL SHIRT |
| MSRP | $15.99 |
| LIST PRICE | $15.50 |
| CURRENT PRICE | $13.50 |
| MANUFACTURER | WIDGET CO |

| COLOR | SIZE | STOCK QUANTITY | SKU |
|---|---|---|---|
| RED | MEDIUM | 913 | 343DSE4356AR |
| BLUE | LARGE | 99 | 343DSE4356AB |

⊖ Add Product Customization Attribute to Catalog

Copy a Previous Product Customization Attribute

Attribute Name [            ]

OR

Create a New Product Customization Attribute

Attribute Name

[ Select a Custom Logo ]

Select Type of Customization

Type [ CUSTOM LOGO ] ← 305

- MONOGRAM
- GIFT WRAPPING
- PACKAGING
- TAILORING
- CUSTOM LOGO

Select Poss... G2 G3

- Right ...
- Left ...
- Both Sleeves
- Shirt Pocket  ☐ ☒ ☐
- Collar        ☐ ☐ ☐
- Shirt Tag     ☐ ☐ ☐
- Right Side    ☐ ☒ ☐
- Left Side     ☐ ☐ ☐
- Front         ☐ ☐ ☐
- Back          ☐ ☐ ☐

○ And  ○ And
⦿ Or   ○ Or ( Next )

Catalog Entry — Example Data

| NAME | POLO SHIRT |
|---|---|
| CATEGORY | MEN SHORT SLEEVE CASUAL SHIRT |
| MSRP | $15.99 |
| LIST PRICE | $15.50 |
| CURRENT PRICE | $13.50 |
| MANUFACTURER | WIDGET CO |

| COLOR | SIZE | STOCK QUANTITY | SKU |
|---|---|---|---|
| RED | MEDIUM | 913 | 343DSE4356AR |
| BLUE | LARGE | 99 | 343DSE4356AB |

⊖ Add Product Customization Attribute to Catalog

Copy a Previous Product Customization Attribute

Attribute Name [ ⇕ ]   401

OR

Create a New Product Customization Attribute
Attribute Name

[ Select a Custom Logo ]

Select Type of Customization   303
Type [ CUSTOM LOGO ⇕ ]

◉ And
○ Or

| Select Possible Logos | | G4 | G5 | G6 |
|---|---|---|---|---|
| Logo 1 | Image uploaded | ☒ | ☐ | ☐ |
| Logo 2 | Image uploaded | ☒ | ☐ | ☐ |
| Logo 3 | Upload Image | ☒ | ☐ | ☐ |
| Add logo | | | | |

○ And  ○ And
○ Or   ○ Or ( Preview ) ( Assign Fees ) ( More ) ( Submit )

FIG. 4

Catalog View

501

Data

| | |
|---|---|
| NAME | POLO SHIRT |
| CATEGORY | MEN SHORT SLEEVE CASUAL SHIRT |
| MSRP | $15.99 |
| PRICE_LIST | $15.50 |
| PRICE_CURRENT | $13.50 |
| MANUFACTURER | WIDGET CO |

| COLOR | SIZE | STOCK QUANTITY | SKU |
|---|---|---|---|
| RED | MEDIUM | 913 | 343DSE4356AR |
| BLUE | LARGE | 99 | 343DSE4356AB |

| PRODUCT CUSTOMIZATION | FEE | SKU |
|---|---|---|
| Select a Custom Logo | $3 | 343DSE4356PC1 |
| Select a Custom Logo | $3 | 343DSE4356PC2 |

⊕ Add Product Customization Attribute to Catalog

FIG. 5

PRODUCT CUSTOMIZATION OFFERINGS

BACKGROUND

Software or program code for a particular product customization offering (e.g., offer to add a monogram to the product in the product catalog) is specifically written for a product in a product catalog in many cases when product customization offerings are built for an online retail environment. This does not provide much flexibility for a merchant to further enhance the options provided in a particular customization offering without requiring additional manual writing of the necessary code.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 2-7 are drawings of user interfaces of various embodiments of the electronic commerce application of FIG. 1 according to various embodiments of the present disclosure.

DETAILED DESCRIPTION

Embodiments of the disclosure include computing infrastructure and resources that can facilitate multiple electronic marketplaces on behalf of multiple sellers and retailers. This infrastructure can include a product catalog that can house information about the various products, services and/or content made available by sellers in various marketplaces. Such a product catalog can be structured in a way to provide various possible fields, or attributes, that a seller can populate with product information. One such attribute involves product customization, where product customizations may be augmentations in terms of services on a product (e.g., monogramming, gift wrapping, etc.) or actual variance in the purchased product (e.g., choosing to add additional memory to a laptop computer).

The product catalog structure can be shared across various sellers and marketplaces to avoid the requirement of maintaining multiple product catalog structures. However, certain sellers and/or marketplaces operated by various sellers may desire alternative customization offerings. Accordingly, embodiments of the disclosure allow a seller or other authorized user to add product customization offerings to a product catalog with which they are associated. In the following discussion, a general description of the system and its components is provided, followed by a discussion of the operation of the same.

Figure 1:
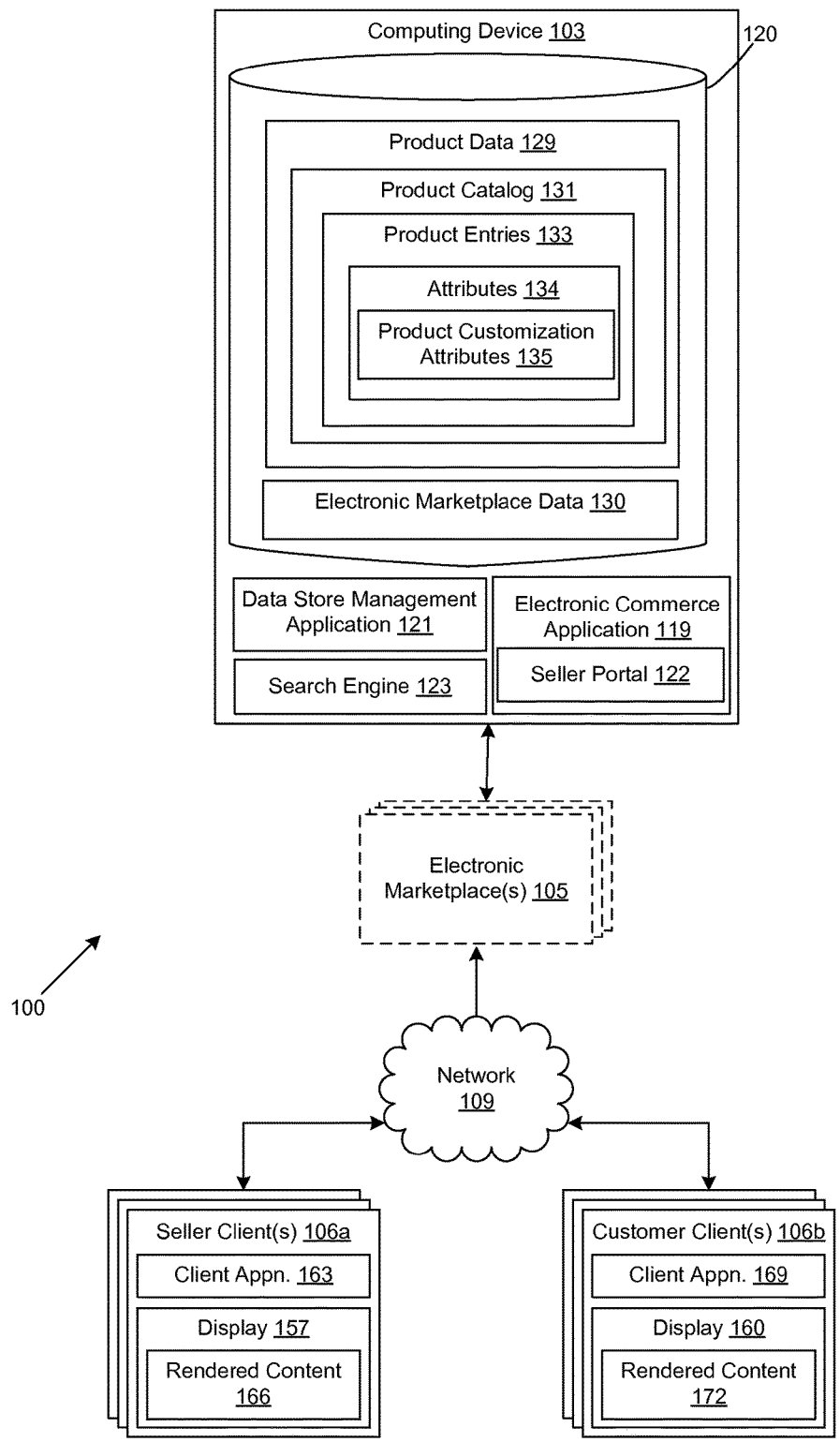
FIG. 1 is a drawing of a networked environment according to various embodiments of the present disclosure.

With reference to FIG. 1, shown is a networked environment 100 according to various embodiments. The depicted networked environment 100 illustrates one example of an implementation of a system according to an embodiment of the disclosure. It should be appreciated that embodiments of the disclosure can be implemented in various ways. The networked environment 100 includes at least one computing device 103 and one or more clients 106 in communication over a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

The computing device 103 and the services and data accessible to the computing device 103 can facilitate one or more electronic marketplaces 105. An electronic marketplace 105 can include an electronic commerce site and/or storefront powered by the resources of the computing device 103. For example, a retailer may establish their own electronic commerce sites through which they can offer products to users, and the various electronic commerce sites can be powered by the applications and data accessible to the computing device 103. To this end, various applications and/or other functionality may be executed in the computing device 103 according to various embodiments. Also, various data is stored in a data store 120 that is accessible to the computing device 103. The data store 120 may be representative of a plurality of data stores as can be appreciated. The data stored in the data store 120, for example, is associated with the operation of the various applications and/or functional entities described below. It should be appreciated that the data store 120 may or may not reside within a computing device 103, but may be accessible via a network to the computing device 103.

The components executed on the computing device 103, for example, include an electronic commerce application 119, a data store management application 121, a seller portal 122, search engine 123, and other applications, services, processes, systems, engines, or functionality not discussed in detail herein. The electronic commerce application 119 can facilitate the various electronic marketplaces 105 associated with one or more retailers through which customers can purchase, rent, and/or download products. To this end, the electronic commerce application 119 can process orders on behalf of customers and transmit network pages or other user interface elements that can be rendered on a client 106. Similarly, the electronic commerce application 119 can receive data from a client 106 pertaining to product selections, payment information, and other data necessary to effectuate an electronic commerce site.

The data stored in the data store 120 includes, for example, product data 129, electronic marketplace data 130, and potentially other data, such as order data, browse data, etc. Product data 129 can include various information about products available via an electronic commerce system facilitated by the computing device 103. The product data 129 can include a product catalog 131, which can include various product entries 133 that are associated with products, services, and/or content that can be offered by sellers in various electronic marketplaces 105 facilitated by the computing device 103.

A product entry 133 may refer to a product, good, service, software download, multimedia download, social networking profile, or any combination, bundle, or package thereof, that may be offered for sale, purchase, rental, lease, download, and/or any other form of consumption as may be appreciated. The various data stored in product catalog 131 may include attributes 134. Further, product entries 133 may be associated with product attributes 134, which contain information specific to a product to which a product entry 133 corresponds, which can include a product category and/or other data with which a product can be related to others in the product catalog 131.

Various attributes may comprise seller data including pricing data and inventory data. For example, titles, descriptions, quantities, conditions, images, options, weights, customer reviews, customer ratings, keywords, shipping restrictions, prices, tax classifications, unique identifiers, and any other data related to product entries or items 133 may be included. Therefore, the product catalog 131 may include information or attributes 134 related to a plurality of product entries or items 133 offered in the electronic marketplace by one or more sellers. The product catalog 131 may also include product customization attributes 135 involving product customization offerings, in accordance with the present disclosure. Accordingly, a subset of product attributes 134 may include product customization attributes 135 which describe customizations options and features for a product.

Attributes 134 can also include information about a marketplace with which the product is associated, such as, for example, a marketplace identifier and/or a seller identifier. Attributes 134 can also include browse nodes to which a product is assigned. In this context, a browse node can include a category or a part of a hierarchy to which a product is assigned. Information contained in attributes 134, including product customization attributes 135, may appear on a product detail page and may also be used to help customers find a desired product or product offering in search results.

Product customization offerings delineated by the product customization attributes 135 may differ according to the merchant selling a product. In one embodiment, all available product customization offerings may be initially displayed on a particular product detail page and then depending on which product customization offerings a user selects, the merchants or sellers offering the product are narrowed or restricted in the display to those that offer the selected product customization offerings. Also, in one embodiment, the product detail page may display the product and then list the merchants offering the product including a list of the available product customizations offered by the merchants.

The product catalog 131 can be associated with a product catalog structure that describes how the various product entries 133 are structured. The data store 120 can employ the same product catalog structure for various products that can be offered across various electronic marketplaces 105 and by various sellers. In this way, product data can be surfaced for display in a user interface, orders processed, and other functions can be performed across various electronic marketplaces 105 against a common product catalog structure in the data store 120.

The electronic marketplace data 130 includes data relating to one or more electronic marketplaces in which multiple sellers participate. For example, the electronic marketplace data 130 may include data relating to various customers who have accounts with the electronic marketplace and/or customers who have placed orders with sellers through the electronic marketplace. The order data includes data relating to a plurality of orders placed by customers through the electronic marketplace. The browse data includes data relating to the browsing of the offerings of the electronic marketplace by customers. Such browse data may include records of selections, click trails, page views, and/or other data related to browsing the electronic marketplace.

The seller data includes various data relating to sellers participating in the electronic marketplace such as, for example, pricing data, inventory data, and other data. The pricing data describes the pricing of the various product entries 133 offered by the seller in the electronic marketplace. The inventory data describes the current inventory of the various product entries 133 offered by the seller in the electronic marketplace.

The seller client 106a and the customer client 106b are each representative of a respective plurality of client devices that may be coupled to the network 109. The seller client 106a and the customer client 106b may each comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, smartphones, electronic book readers, or other devices with like capability. The seller client 106a may include a display 157, and the customer client 106b may include a display 160. The display 157, 160 may comprise, for example, one or more devices such as cathode ray tubes (CRTs), liquid crystal display (LCD) screens, gas plasma-based flat panel displays, LCD projectors, or other types of display devices, etc.

The seller client 106a may be configured to execute various applications such as a client application 163 and/or other applications. The client application 163 may be executed in a seller client 106a, for example, to access and render network content such as network data served up by the computing device 103 and/or other servers. The client application 163 thereby generates rendered content 166 on the display 157. The seller client 106a may be configured to execute applications beyond client application 163 such as, for example, browser applications, mobile applications, email applications, instant message applications, and/or other applications.

The customer client 106b may be configured to execute various applications such as a client application 169 and/or other applications. The client application 169 may be executed in a customer client 106b, for example, to access and render network content such as network data served up by the computing device 103 and/or other servers. The client application 169 thereby generates rendered content 172 on the display 160. The customer client 106b may be configured to execute applications beyond client application 169 such as, for example, browser applications, mobile applications, email applications, instant message applications, and/or other applications.

Next, a general description of the operation of the various components of the networked environment 100 is provided. To begin, sellers at seller clients 106a register with the electronic marketplace and configure offerings of various product entries 133. Accordingly, a seller may sell an item that is not currently sold in the marketplace and configure a product entry for this item. Also, the seller may sell an item that is an existing item in the marketplace. In either case, the seller may also provide item attributes and product customization options associated with the product entry for the item.

Therefore, sellers may specify inventory quantities, initial pricing, and/or other configuration parameters. Customers at customer clients 106b browse a network site served up by the electronic commerce application 119 which corresponds to the electronic marketplace. Various data in the electronic marketplace data 130 and the product catalog 131 may be employed to serve up network data as network pages or other forms of network content to be rendered as rendered content 172 by the client application 169 in the customer client 106b.

A search engine 123 may be provided for customers to search for products of interest. Some products may be offered by multiple sellers, possibly at different prices and with different conditions. The customers may view information related to several sellers and ultimately decide to purchase a product from one or more of the sellers. Consequently, the customers initiate the checkout process and complete orders via an order pipeline of the electronic commerce application 119. Order history in the order data and browse history in the browse data may be created from the customer interactions. Inventory data may be updated based at least in part on the orders.

The seller portal 122 provides assistance functionality to sellers to manage their presence in the electronic marketplace. The seller portal 122 generates network data corresponding to user interfaces. The network data is sent over the network 109 for rendering as rendered content 166 by a client application 163 executed in a seller client 106a.

For example, a user may access an electronic marketplace 105 associated with a first retailer, which can cause network pages associated with the retailer's site to be transmitted to the user client. A user may search, browse, and/or purchase products from the first retailer's electronic marketplace 105, which can be facilitated by the electronic commerce application 119. Similarly, a user may access an electronic marketplace 105 associated with a second retailer, which can likewise cause network pages associated with the retailer's site to be transmitted to the user client. The electronic marketplace 105 associated with the second retailer may comprise different user interface elements and other site elements, which can be customized according to a site look and feel desired by a retailer. Accordingly, the computing device 103 may execute various applications or services through which a seller can manage and/or access various information about an electronic marketplace 105 facilitated by the electronic commerce application 119. The specific functionality and various implementations of an electronic commerce application 119 that facilitates an electronic marketplace 105 should be appreciated by a person of ordinary skill in the art, and is not discussed in detail herein.

The data store management application 121 is executed to provide mechanisms by which users (e.g., sellers, retailers, etc.) can access data pertaining to products offered by the seller via an electronic marketplace 105. In other words, the data store management application 121 can allow a seller to access a product catalog 131 stored in a data store 120 accessible to the electronic commerce application 119. Accordingly, the data store management application 121 can generate a user interface that can be accessible in a browser or other type of application executed in a client 106 in which a user can view a product catalog structure as well as add or modify entries 133 in a product catalog 131, such as those involving product customizations.

In the context of this disclosure, the data store management application 121 can also allow a seller to define product customization attributes 135. As one example, assuming a product catalog structure specifies various product catalog entries 133, a seller may wish to define customization offerings for particular products in particular product categories. Accordingly, rather than requiring a seller to request a software developer or other technician for specific product customization offerings to be tailored for specific products in specific product categories, a user interface is generated for a client (e.g., logic that generates a network page displaying the product catalog 131) allowing the seller to define such a product customization attribute 135, which can be stored in the data store 120. Accordingly, the data store management application 121 can provide mechanisms whereby a user can select a product category or applicable subcategories and define a customization offering in a product catalog structure based upon a template provided for the selected category/subcategory.

In some embodiments, the functionality of the data store management application 121 may be included in the electronic commerce application 119. In other embodiments, the data store management application 121, seller portal 122, and/or search engine 123 may be executed as a sub-module of the electronic commerce application 119, or as a separate, standalone application, etc.

As referenced above, embodiments of the disclosure can facilitate creation of product customization attributes 135 associated with a product catalog 131. Additionally, in one embodiment, the creation of the product customization attributes 135 can be accomplished via a general user interface that is subject to being adapted for use with products in a multitude of product categories, where the product customization attributes 135 share the same fundamental structure.

Embodiments of the data store management application 121 can provide various mechanisms with which a seller can create a product customization attribute 135. In one embodiment, the data store management application 121 can provide a user interface on a client application 163 (e.g., browser) in which a seller can load a template interface for a selected product category or subcategory in which the template interface provides selectable options for specifying desired customization parameters. Therefore, to specify the available customization offerings for a first product in a first category, the seller can utilize the template interface designed for the first category. As an example, a template interface for an automobile category is built with an option for the seller to specify that a satellite radio is a customizable product offering. Whereas, a template interface for a tennis racket category is built with an option for a service to tighten the strings of the racket and does not include the option of offering a satellite radio. Also, in some embodiments, a template interface for a particular item may be provided, such as a particular model of tennis racket.

In another embodiment, the data store management application 121 can provide an application programming interface (API) with which a seller system can interact to create and/or manage an individualized template for a product for which a template interface may not be available or may not be to a seller's liking. Therefore, the seller can define its own template interface to design particular product customization(s) that may not be supported by the templates previously provided. After the template interface is created, it may be stored and used at subsequent times. Alternatively, the application programming interface (API) may be used to create the product customization attribute directly from the API without creation of (and therefore bypassing use of) the template interface.

Embodiments of the data store management application 121, therefore, utilize an architecture that enables merchants and sellers to build a type of product customization offering without being constrained by a definite particular schema or format. Via product customization templates and/or API, embodiments enable the seller to graphically select requisite parameters or be prompted to submit information that will define the seller's desired product customization offering. In one embodiment, the seller is walked through defining its customization attributes for a particular product via the template interface or API. Accordingly, in a serial manner, the seller is provided design choices via a graphical interface and selects the desired choice and then proceeds to the next step in defining the product customization attribute 135.

Turning now to FIG. 2, shown is one example of a user interface 201 that can be rendered in a client application 163 (FIG. 1) (e.g., browser) on a seller client 106a (FIG. 1). The depicted user interface 201 can be generated by the electronic commerce application 119 (FIG. 1) in concert with the data store management application 121 (FIG. 1) so that a user can create product customization attributes 135 (FIG. 1) in a product catalog 131 (FIG. 1). In the depicted example, the user interface 201 can allow a seller associated with an electronic marketplace 105 and/or sales listings in an electronic marketplace 105 (FIG. 1) to view, search, browse, etc., or perform other actions related to product entries 133 (FIG. 1) in a product catalog 131. The example of FIG. 2 illustrates an example of a user interface 201 in which a product entry 133 to be associated with a seller is displayed. The item associated with the product entry may be a preexisting product in the seller's product catalog or may be an item already offered via the marketplace and is being added to the seller's product catalog. The various product attributes 134 (FIG. 1) shown in FIG. 2 are associated with the underlying product catalog structure. However, the user interface 201 also illustrates one example of a selectable control 220 for a seller to create a product customization attribute 135.

In FIG. 2, the product entry being shown is named as "Polo Shirt" under the product category "Men Short Sleeve Casual Shirt." Attributes associated with the product entry include the manufacturer being identified as "Widget Co.", manufacturer's suggested retail price (MSRP) of $15.99, a list price of $15.50, and a current price of $13.50. Child attributes for the product entry include a variation of the shirt being provided as color red and size medium, where 913 units of this shirt are in stock, and the stock keeping unit (SKU) code for this variation of the product is 343D5E4356AR. The child attributes further include an additional variation of the shirt being provided as color blue, size large, where 99 units of the shirt are in stock, and the stock keeping unit (SKU) code for this variation of the product is 343D5E4356AB.

Continuing the example of FIG. 2, reference is now made to FIG. 3A, which illustrates an example of a user interface 301 in which a seller can define a product customization attribute 135 (FIG. 1). In particular, the user interface 301 provides a template interface suited for the particular product category of the product entry 133 (FIG. 1). In the depicted example, a user is provided an option of selecting a previously defined product customization attribute via dropdown box 302 or to create a new product customization attribute via interface box 303. For example, the user may have previously created a product customization offering for a different type of shirt that is applicable to the polo shirt being currently considered. Therefore, the user could select this product customization attribute via the dropdown box 302 and have it applied towards the product entry corresponding to the polo shirt. Otherwise, the user can specify a product customization offering using the interface box 303.

In the interface box 303, the user is prompted (in input box 304) to specify a name or other identifier associated with the product customization attribute 135. Here, the user has entered "Select a Custom Logo" as the name for the product customization attribute 135. Additionally, a user can identify or designate a set of options particular to the product customization offering being defined. For instance, a user may select a type of product customization or augmentation in a dropdown box 305. Therefore, the options that follow may be adaptive and responsive to the choice selected in the dropdown box 305. Therefore, if a different option was selected in the dropdown box 305, different options may be presented under the dropdown box 305.

Here, the user selected the type of customization to be a custom logo. It may be that the user is provided a list of a multitude of different types of customizations from which to select. To demonstrate, FIG. 3B depicts the user interface with the dropdown box 305 displaying a menu of available choices, such as monogramming the shirt, selecting a special packaging for the shirt (e.g., a special gift box), choosing an option of requesting tailoring of the shirt, etc.

Referring back to FIG. 3A, the user is prompted to select the possible locations for placing the logo (being customized) on the shirt. Further, a variety of locations may be grouped together as a set of options from which the user can select his or her desired choice. For example, a first group (G1) of locations consists of the right sleeve, the left sleeve, and both sleeves, as indicated by the checkboxes selected by the user. Additional groups may also be specified. In this case, the user has specified a second group (G2) consisting of the shirt pocket and the right side. Accordingly, the user may allow for two logos to be added to the shirt, where one logo is positioned in one of the options provided in the first group and a second logo is positioned in one of the options provided in the second group. Alternatively, the user may allow for one logo to be added to the shirt, where one logo is positioned in either one of the options provided in the first group or one of the options provided in the second group. To designate which of these possibilities is desired, the user can select the button next to the And/Or option under the first group (G1). In this example, the user has selected the Or option so either an option selected from the first group or an option selected from the second group is allowed. Accordingly, using the template of the user interface 301, the user can make graphical choices as to how a product customization offering for a particular product should be set up. It is noted that if the product was a vest jacket, then a different template would be used and different options would be presented. For example, for a vest jacket, an option would not be provided to customize a sleeve, since a vest jacket does not contain any sleeves.

Moving on to FIG. 4, the process of creating the product customization attribute may continue with a series of user interfaces being provided one after another, in one embodiment. In FIG. 4, a user interface 401 is provided with updated contents to the interface box 303. Here, the user is prompted to select the logos to be offered as options in the product customization offering for the product entry 133 (FIG. 1). In this example, the user selected to offer three logos, Logo 1, Logo 2, and Logo 3 as a single group (G4), where this offering group is connected to the previous choices with an AND designation.

Additionally, for Logo 1 and Logo 2, the user selected to upload images for the logos and for Logo 3, the user has selected to allow a customer to upload his or her own image to be used as a logo. Therefore, the user has not uploaded an image for Logo 3.

The customization options offered for a product may vary by merchant or seller. Thus, in one embodiment, customization offerings presented to a consumer depends on which merchant the consumer chooses to buy from. For example, a first merchant may allow adding a logo as a customization option, a second merchant may only offer a few logos, a third merchant may only allow adding your name, etc.

Various embodiments of the user interface 401 may provide additional configurable options. For example, the user may assign fees to respective customization offerings or subset of offerings via the "Assign Fees" button. Further, via the "Preview" button, an exemplary user interface provides an option to see a preview of a representative user interface from a buyer's perspective offering the product customizations that are being designed, before submitting the selected options in the offering. In one embodiment, the user interface may also provide a preview of the type of underlying data that would be available to be provided to the seller for the product customization offering. The options and controls provided in the user interface 401 are not meant to be limiting. For example, various embodiments may provide a different arrangement, where controls and interface tools may be provided on a side of the interface.

In one embodiment, the data store management application 121 (FIG. 1) can validate the selected options to ensure that the product customization attribute 135 (FIG. 1) complies with business rules or syntax supported by the data store 120 (FIG. 1). As another example, the data store management application 121 can validate whether the product customization attribute 135 specifies a price or fee to be associated with possible options designated within the product customization offering. In one embodiment, the data store management 121 enlists or executes authorization attributes to verify that a product customization attribute 135 complies with applicable business rules and syntax before allowing the attribute to be stored in the data store 120. Accordingly, authorization attributes may be classified or broken down by product categories.

In one embodiment, the business rules may be predefined or configured by the seller. For example, a user interface may be provided for a seller to specify "banned" terms or certain types of photos or images that cannot be added as logos (e.g., adult content), an acceptable size of the logo (e.g., logo for a sleeve cannot be larger than a stated size, while logo for the front of the shirt can be larger, etc.), an acceptable file size of a logo image to be uploaded, etc.

Upon submission of the product customization attribute 135 as shown in FIG. 4, the product entry 133 in the product catalog 131 (FIG. 1) may be updated with the newly added product customization attribute(s) 135. Turning now to FIG. 5, shown is one example of a user interface 501 that can be rendered in a client application 163 (FIG. 1) (e.g., browser) on a seller client 106a (FIG. 1). In the depicted example, the user interface 501 provides a view of the product catalog structure for a product entry 133 (FIG. 1), as previously represented in FIG. 2. However, a product customization offering has been added as reflected by the product customization attributes 135 (FIG. 1) to select a custom logo, where one attribute involves an offering as to where on the sleeve (s) of the shirt the logo is to be placed and the second attribute involves an offering as to identify the particular logo to be used.

Further, upon submission of the product customization attribute 135 as shown in FIG. 4, the data store management application 121 (FIG. 1) can display a product customization offering associated with the product entry 133 within the electronic marketplace 105 for a particular seller. In the case of the example in FIGS. 3-4, a presentation layer can access the product customization attribute 135 "Select a Custom Logo" associated with a particular product entry 133. In addition, multiple product customization offerings may be displayed for product entries offered by multiple merchants corresponding to the same product item. For example, multiple merchants may offer the same shirt for sale, where Merchant 1 only allows adding a logo to the front of the shirt, Merchant 2 allows adding a logo to the front of the shirt and sleeves, Merchant 3 only offers monogramming, etc.

Figure 6:
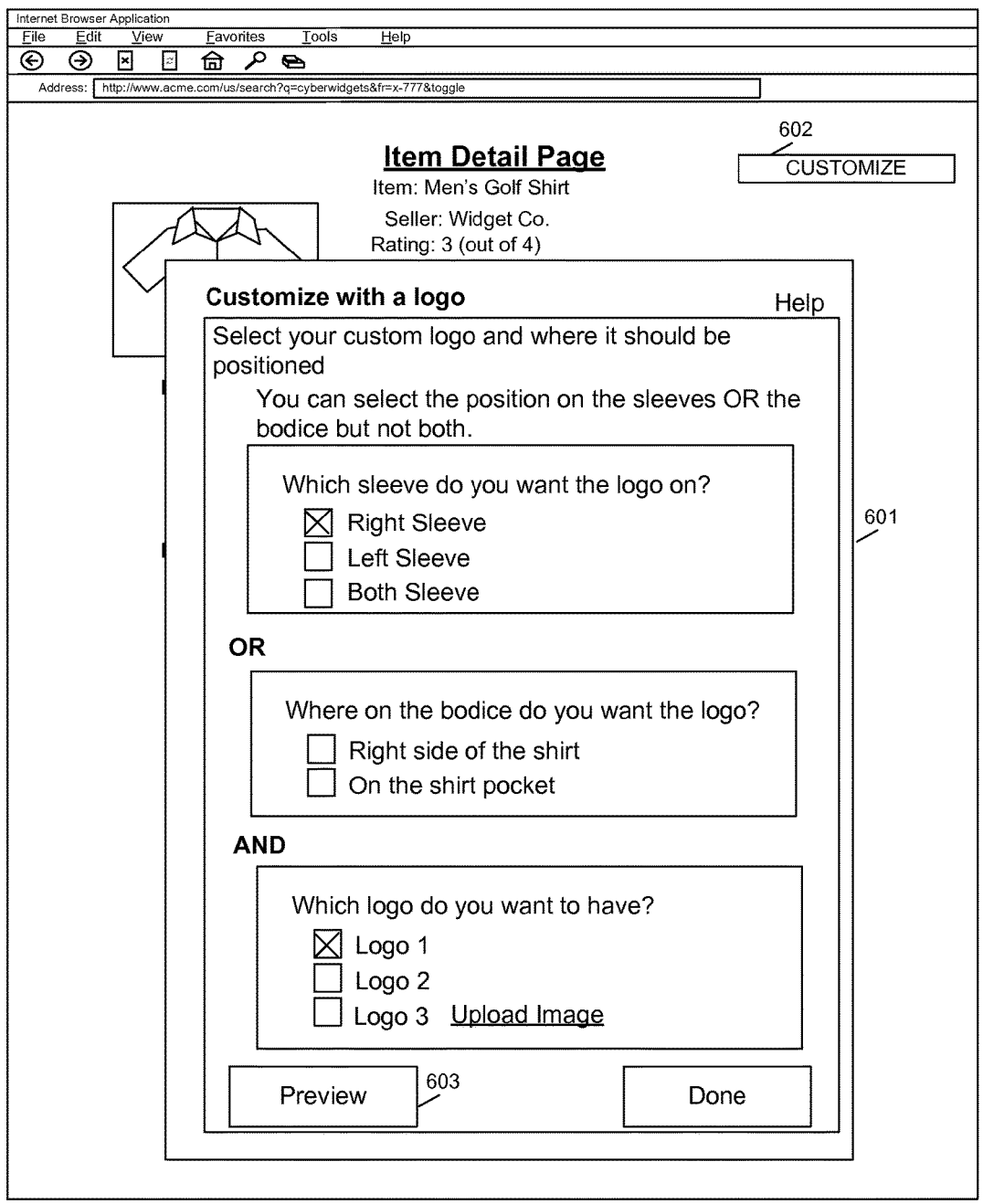

Referring now to FIG. 6, an exemplary user interface 601 for presenting the product customization offering defined in FIGS. 3-4 to a customer or prospective buyer is depicted. In the figure, an item detail page for a Men's Golf Shirt provides an option 602 to customize or augment the shirt in addition to purchasing the shirt. In response to selecting the option 602, a user interface 601 may be caused to be displayed on a customer's browser. Accordingly, the user interface 601 prompts the customer to select a position on a shirt to place a logo design, where the available options are the ones previously defined by the seller in creating the product customization attribute 135 (FIG. 1) in FIGS. 3-4. Further, the customer is prompted to select a particular logo design, where the available logo options are the ones selected by the seller in FIGS. 3-4. In one embodiment, at the onset of selecting or configuring the type of product customization that is desired, all customization options available by the sellers offering the shirt are displayed (e.g., add a logo, monogram, etc.). And then as the user specifies or selects desired options (e.g., the user selects to add a logo on the right sleeve), certain other options might be ghosted out or made not available for selection, since these options are no longer applicable with the choices made by the user. Alternatively, if the user selects an option that is not valid with the seller's product customization offering or prescribed business rules, an error message or screen may be displayed to the user instructing the user to make another selection. For example, the seller may be able to specify a business rule that only the last names of current players on the Atlanta Braves are able to be added to the back of a replica Atlanta Braves jersey being sold in the seller's product catalog. Therefore, if a customer attempts to add the name of a Philadelphia Phillies player to the back of the jersey (that is not specified within an acceptable list of names for the product item), the customer may be instructed to make another selection.

Accordingly, the user interface 601 is driven by the same information the seller entered when specifying the product customization attribute 135 for the product entry 133 (FIG. 1). The user interface 601 may also provide a preview button 603 to see an image of a model of the shirt according to the particular customization options selected by the customer. In this example, the customer has selected the option of placing a logo named Logo 1 on the right sleeve of the shirt.

Therefore, if these options were selected and purchased with the shirt listed on the item detail page, data would be created for the purchase contract, in one embodiment. This data may include the SKUs (stock keeping unit identifiers) for the particular customization offerings that can only be purchased in the context of product entries 133 to which the product customization attributes are children. From the foregoing examples, sellers can extend customization to their catalog of products in a self-service manner and not enlist the instruction of a platform developer or technician for the online retail website.

Figure 7:
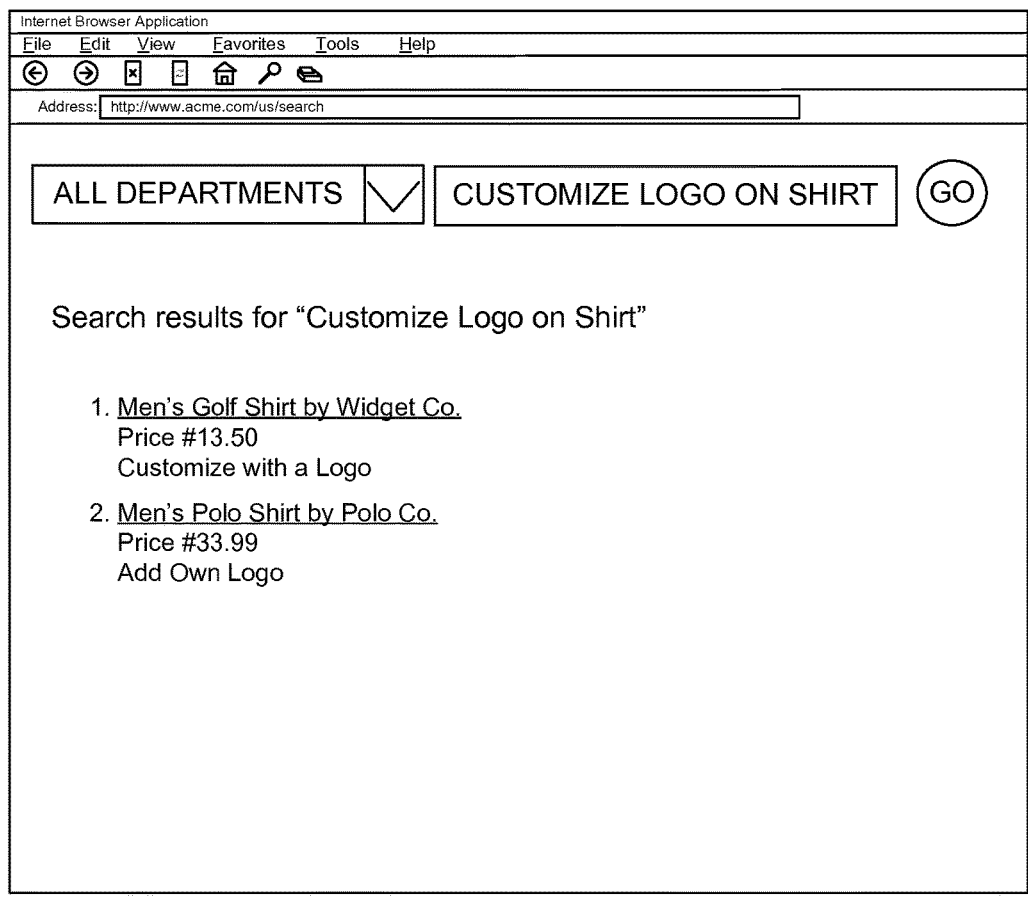

An additional benefit of creating of product customization attributes 135 is that the attributes 135 provide helpful search criteria. For example, in FIG. 7, a user interface 701 to a search engine 123 (FIG. 1) is depicted, where keywords to a search query may describe a product customization offering or may be relevant to a product customization offering for one of the products in the product catalog 131 (FIG. 1). Accordingly, a search engine 123 can filter search criteria by augmentation or customization criteria. For instance, a customer may be looking for a monogrammed bathrobe, where the customer can narrow down the available choices by first searching for monogrammed bathrobes and then further narrowing the choices by choosing a color. Referring to FIG. 7, a search query "Customize Logo on Shirt" is input into a search engine 123 that returns the results of two products from the catalog 131 that offer a product customization offering involving logos on shirts.

Figure 8:
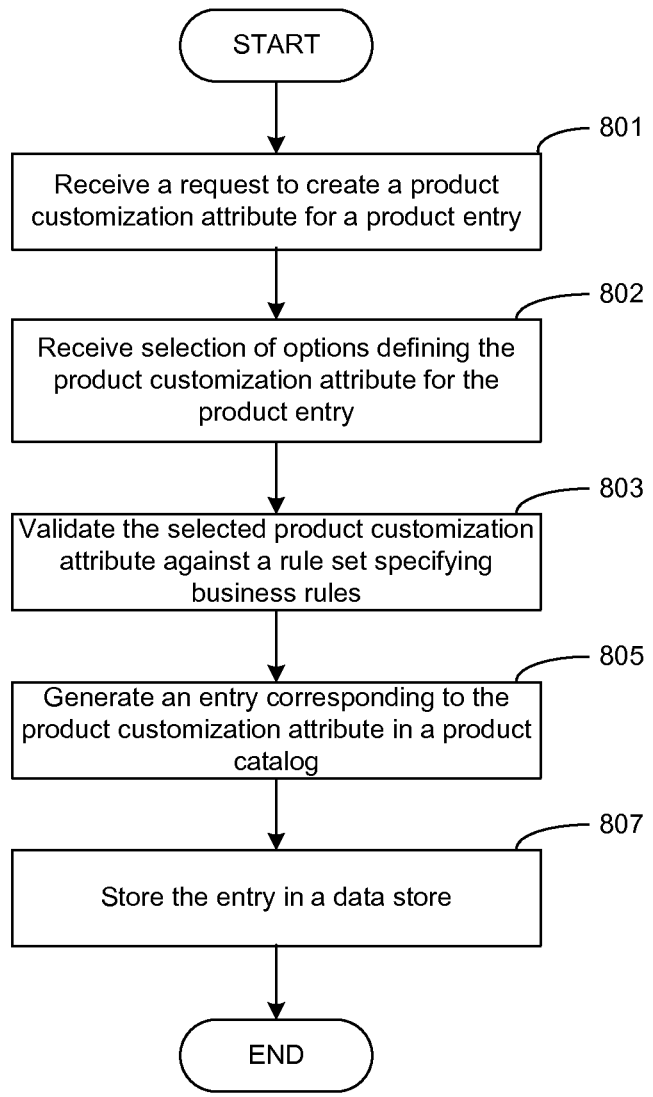
FIGS. 8-9 are flowcharts illustrating various examples of functionality implemented as portions of a data store management application executed in a computing device in the networked environment of FIG. 1 according to various embodiments of the present disclosure.

Referring next to FIG. 8, shown is a flowchart that provides one example of the operation of a portion of the computing device 103 (FIG. 1) (e.g., electronic commerce application 119 (FIG. 1) in concert with the data store management application 121 (FIG. 1)) according to various embodiments. It is understood that the flowchart of FIG. 8 provides merely an example of the many different types of functional arrangements that may be employed to implement the operation of the portion of the data store management application 121 as described herein. As an alternative, the flowchart of FIG. 8 may be viewed as depicting an example of steps of a method implemented in the computing device 103 (FIG. 1) according to one or more embodiments.

Beginning with box 801, the computing device 103 can receive a request to create a product customization attribute 135 (FIG. 1) associated with a product entry 133 (FIG. 1) in a product catalog 131 (FIG. 1). As described above, the product customization attribute 135 is a feature or group of features of the product entry that involves product customization or augmentation offerings available to a customer. Further, the product customization attribute 135 can be defined using a prebuilt template interface corresponding to the category designation assigned to the product, where a different template is provided per product category. In another embodiment, the computing device 103 can provide an application programming interface (API) with which a seller system can interact to create and/or manage an individualized template for a product for which a template interface may not be available or may not be to a seller's liking. Creation of a new template is carried out in a similar manner as how a seller may define a product customization offering using the interfaces of FIGS. 3-4, except that the seller may consider more possible choices and make more decisions given that the vast customization possibilities that are possible, where the desired options may need to be specified from all the possibilities. Therefore, the seller can select options that help define the product customization attribute and the associated product customization offering which are received in box 802.

In box 803, the computing device 103 can validate the selected product customization attribute against a rule set of business rules. According to various embodiments, the business rules may be established by the electronic marketplace or may be configured by the individual seller itself. Next, in box 805, the computing device 103 can generate an entry corresponding to the product customization attribute 135 to be associated with the product entry 133 in a product catalog 131. Such an entry 133 can identify an electronic marketplace 105 (FIG. 1) and/or seller with which the product customization attribute 135 is associated. In box 807, the entry 133 containing the product customization attribute 135 can be stored in the data store 120. Further, other attributes may also be associated and contained as part of the product entry 133.

Therefore, a seller may specify a product customization offering offered for the seller with respect to a product entry in the seller's product catalog 131. One of the attributes associated with this product entry may also be a standard product identification number (e.g., Amazon Standard Identification Number, Universal Product Code, International Standard Book Number, etc.) for the product item corresponding to the product entry 133. Therefore, product customization offerings by other sellers with respect to product entries associated with the same standard product identification number may be available for viewing for a detail page corresponding to the product item having the standard product identification number.

Figure 9:
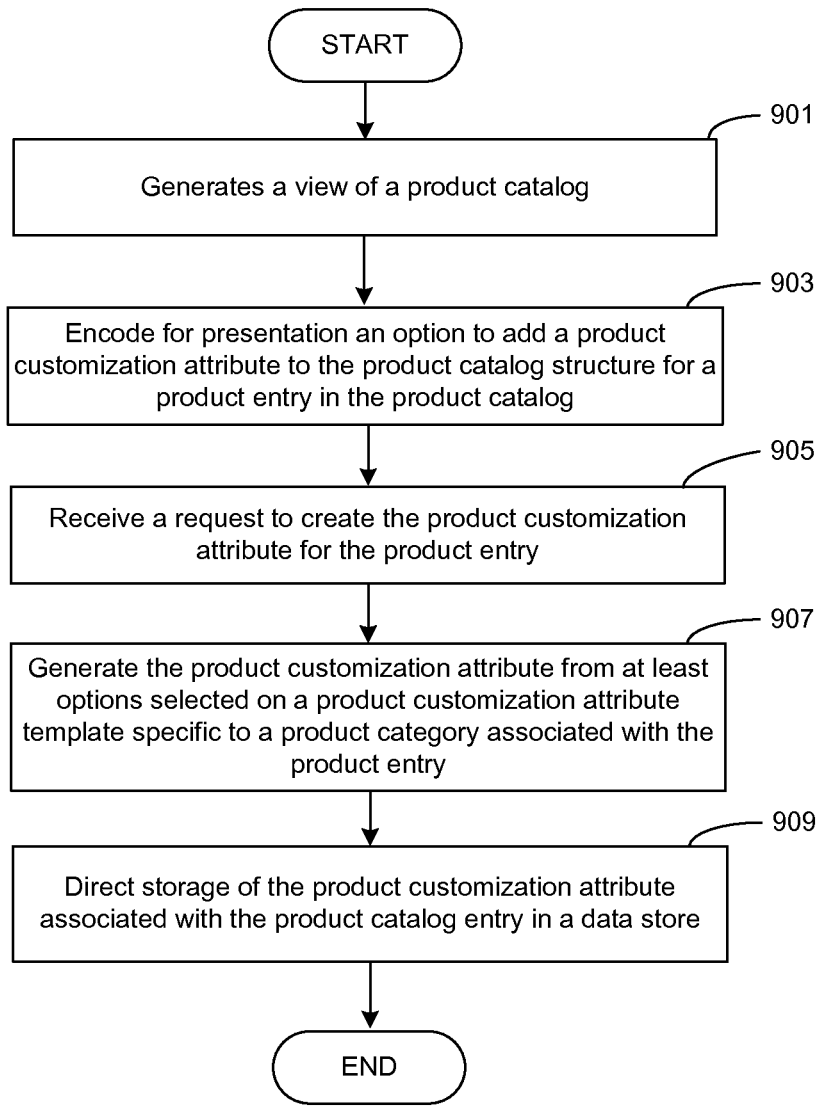

Referring next to FIG. 9, shown is a flowchart that provides one example of the operation of a portion of the computing device 103 (FIG. 1) (e.g., electronic commerce application 119 (FIG. 1) in concert with the data store management application 121 (FIG. 1)) according to various embodiments. In box 901, the computing device 103 generates a view of a product catalog 131 to a seller. Next in box 903, the computing device 103 encodes for presentation an option to add a product customization attribute 135 (FIG. 1) to the product catalog structure for a product entry 133 (FIG. 1) in the product catalog 131 (FIG. 1), and the computing device 103 receives a request to create the product customization attribute 135 for the product entry 133, in box 905. For example, a seller may desire to add a product customization offering for a product item in the seller's product catalog. Accordingly, in box 907, the computing device 103 generates the product customization attribute 135 from at least options selected on a product customization attribute template specific to a product category associated with the product entry 133, where the product customization attribute 135 describes a product customization offering for a product item identified by the product entry 133. In addition, the computing device 103 directs (FIG. 1) storage of the product customization attribute 135 associated with the product catalog entry 133 in a data store 120, in box 909.

A wide variety of customizations and augmentations offerings may be facilitated under the architecture of the present disclosure. Possible examples include, but are not limited to including, an option to preassemble a product, an option to use gold thread in monogramming, an option to specify a black shirt and to specify the use of gold thread in monogramming the black shirt, an option to gift wrap a purchased product, an option to include a personalized greeting card with the gift wrapping, an option to choose the color of shoe laces provided in purchased tennis shoes, etc. The foregoing examples are illustrative of the nature of possible product customizations or augmentations that can be constructed in accordance with embodiments of the present disclosure and are not meant to be limiting.

Further, embodiments of the architecture allow sellers or merchants to upload various augmentations they provide for different products and associate a charge with each augmentation; to specify augmentation capability at any given time; in case a merchant is unable to fulfill an augmentation request, to suggest a different augmentation available or may cancel the request; to add new augmentations for any product without requiring any system changes to support that augmentation; to include merchant product customizations selected by the customer in a purchase contract and to pass the contract to merchant for completion at the time of fulfillment; to make some charges or fees mandatory and non-revocable upfront at the time a purchase order is placed, where the mandatory charge information may be displayed on the retail website at the time the order is placed and/or when the order is cancelled; among others. The foregoing examples are illustrative of the nature of possible product customizations or augmentations that can be constructed in accordance with embodiments of the present disclosure and are not meant to be limiting.

From a customer's perspective, embodiments of the architecture allow customers to choose from a list of available augmentations for a product; to select a golden-threaded monogram out of various threads: e.g., red (provided by merchant X), yellow (provided by merchant Y) and golden (provided by merchant Z); to apply multiple augmentations to a single product, where all augmentations may not be from a single merchant—e.g., multiple sellers may be selling the same product item but may offer different customization options in how the product item may be augmented or customized; to re-purchase augmented products from the customer's account on the online retail website; to apply previously augmented combinations to different products; to change augmentations for any previously purchased product in the customer's account; to share augmented products socially; to filter search criteria by augmentation type for products; to view family of augmentations provided by a merchant on an online retail website; to view other customers' feedback for various augmentations provided by merchants; etc. The foregoing examples are illustrative of the nature of possible product customizations or augmentations that can be constructed in accordance with embodiments of the present disclosure and are not meant to be limiting.

Figure 10:
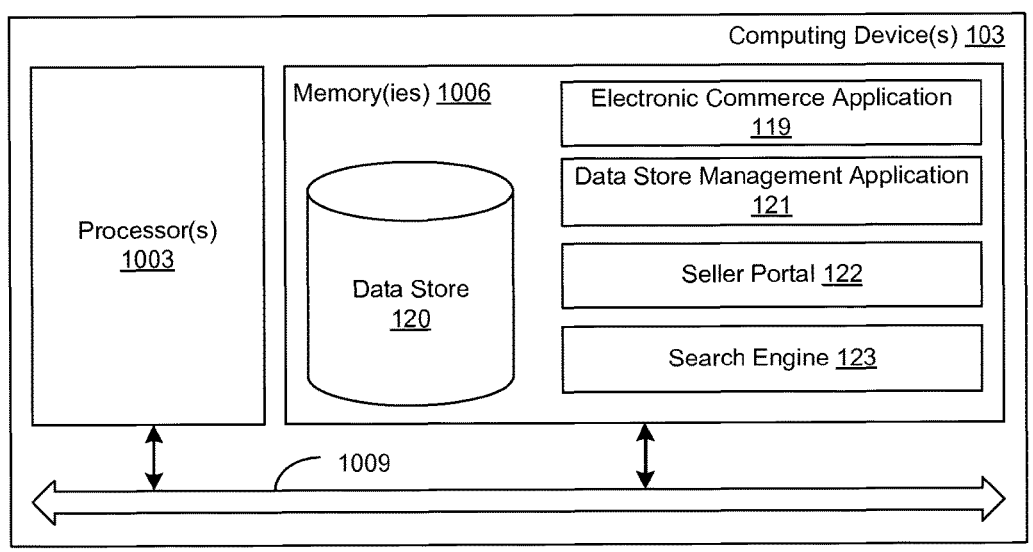
FIG. 10 is a schematic block diagram that provides one example illustration of a computing device employed in the networked environment of FIG. 1 according to various embodiments of the present disclosure.

With reference to FIG. 10, shown is a schematic block diagram of the computing device 103 according to an embodiment of the present disclosure. The computing device 103 includes at least one processor circuit, for example, having a processor 1003 and a memory 1006, both of which are coupled to a local interface 1009. To this end, the computing device 103 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are the electronic commerce application 119, data store management application 121, the seller portal 122, the search engine 123, and potentially other applications. Also stored in the memory 1006 may be a data store 120 and other data. In addition, an operating system may be stored in the memory 1006 and executable by the processor 1003.

It is understood that there may be other applications that are stored in the memory 1006 and are executable by the processors 1003 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and the memory 1006 may represent multiple memories 1006 that operate in parallel processing circuits, respectively. In such a case, the local interface 1009 may be an appropriate network 109 (FIG. 1) that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the electronic commerce application 119, the data store management application 121, the seller portal 122, the search engine 123, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 8-9 show the functionality and operation of an implementation of portions of the data store management application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 8-9 show a specific order of execution, it is understood that the order of execution may differ from that which is depicted. For example, the order of execution of two or more blocks may be scrambled relative to the order shown. Also, two or more blocks shown in succession in FIGS. 8-9 may be executed concurrently or with partial concurrence. Further, in some embodiments, one or more of the blocks shown in FIGS. 8-9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 119, data store management application 121, seller portal 122, and/or search engine 123, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
   generating, by at least one computing device, a network page of a view of a product catalog, the product catalog associated with a product catalog structure in a data store, wherein the product catalog structure provides one or more attributes that can be input with product information for a product entry, the one or more attributes including a product customization attribute;
   transmitting the network page to a client device from the at least one computing device;
   receiving, by the at least one computing device, a selection, via the network page, of a request to create a product customization offering for the product entry in the product catalog, wherein the product entry is associated with a product category;
   transmitting a network page of a product customization offering template specific to the product category responsive to receiving the request from the client device, wherein the product customization offering template is configured to enable a first user to select the product category and define the product customization offering for a product item identified by the product entry;
   generating, by the at least one computing device, the product customization offering from at least one option selected on the product customization offering template, the selection of the at least one option causing a customization parameter to be specified that defines at least in part the product customization offering for the product item identified by the product entry, wherein in a serial manner, a plurality of design choices is provided in defining the product customization offering via a network page having a graphical interface for the product customization offering template, wherein the product customization offering comprises one or more sets of alternative options selectable by a second user to customize the product entry;
   facilitating creation of a new product customization offering template for defining the product customization offering by prompting, via a template interface of the at least one computing device, the first user to select one or more parameters used in creating the new product customization offering template; and
   directing, by the at least one computing device, storage of the product customization offering associated with the product entry in the product catalog as the product customization attribute of the product entry.

2. The method of claim 1, further comprising filtering a plurality of search results for product entries in the product catalog using information from product customization attributes.

3. The method of claim 1, further comprising presenting an option to add the product customization attribute to the product catalog structure for the product entry in the product catalog.

4. A system, comprising:
- at least one computing device; and
- a data store management application executable in the at least one computing device, the data store management application configured to at least:
  - generate a network page of a view of a product catalog, the product catalog associated with a product catalog structure in a data store;
  - present an option to add a product customization offering to the product catalog structure for a product entry in the product catalog;
  - receive a request to create the product customization offering for the product entry;
  - generate the product customization offering from at least one option selected on a network page of a product customization offering template specific to a product category associated with the product entry, wherein the product customization offering template is configured to enable a first user to select the product category and define at least in part the product customization offering for a product item identified by the product entry, wherein the product customization offering comprises one or more sets of alternative options selectable by a second user to customize the product entry; and
  - direct storage of the product customization offering associated with the product entry in the data store as a product customization attribute of the product entry.

5. The system of claim 4, wherein the product customization attribute is associated with an inventory stock identification number that is a child of the product entry.

6. The system of claim 4, further comprising a search engine that is configured to filter a plurality of search results for the product entry in the product catalog using information from the product customization attribute.

7. The system of claim 4, further comprising an application program interface configured to create a new template for defining the product customization offering.

8. The system of claim 4, further comprising an application program interface configured to create a new product customization offering for a second product entry bypassing use of the product customization offering template specific to a particular product category associated with the second product entry.

9. The system of claim 4, wherein the data store management application is further configured to create a purchase contract for the product customization of the product entry that includes at least one value obtained from the product customization offering associated with the product entry.

10. The system of claim 4, wherein the data store management application is further configured to validate the product customization offering against a business rule set before authorizing storing of the product customization attribute in the data store.

11. The system of claim 4, wherein the product customization offering defines at least one of a plurality of first available product customization options in packaging the product item that is a subject of the product entry; a plurality of second available product customization options to augment terms of services on the product item that is the subject of product entry; or a plurality of third available product customization options to vary makeup of the product item that is the subject of the product entry.

12. A method, comprising:
- receiving, by at least one computing device, a request to create a product customization offering for a product entry in a product catalog;
- generating, by the at least one computing device, the product customization offering from at least one option selected on a network page of a product customization offering template specific to a product category associated with the product entry, wherein the product customization offering template is configured to enable a first user to select the product category and define at least in part the product customization offering for a product item identified by the product entry, wherein the product customization offering comprises one or more sets of alternative options selectable by a second user to customize the product entry; and
- directing, by the at least one computing device, storage of the product customization offering associated with the product entry as a product customization attribute of the product entry.

13. The method of claim 12, further comprising validating the product customization offering against a business rule set before authorizing storage of the product customization attribute.

14. The method of claim 12, wherein the product entry is associated with a product identification number and the product customization attribute is associated with an inventory stock identification number that is a child of the product entry.

15. The method of claim 12, further comprising:
- generating a network page of a view of the product catalog, the product catalog associated with a product catalog structure in a data store; and
- encoding for presentation an option to add the product customization attribute to the product catalog structure for the product entry in the product catalog.

16. The method of claim 12, further comprising creating a purchase contract for the product customization of the product entry that includes at least one value obtained from the product customization offering associated with the product entry.

17. The method of claim 12, further comprising facilitating creation of a network page of a new product customization offering template for defining the product customization offering by prompting the first user to select one or more parameters used in creating the product customization offering template.

18. The method of claim 12, further comprising facilitating creation of a new product customization offering for a second product entry bypassing use of the product customization offering template specific to a particular product category associated with the second product entry.

19. The method of claim 12, further comprising filtering a plurality of search results for the product entry in the product catalog using information from the product customization attribute.

20. The method of claim 12, wherein the product customization offering defines at least one of a plurality of first available product customization options in packaging the product item that is a subject of the product entry; a plurality of second available product customization options to augment terms of services on the product item that is the subject of product entry; or a plurality of third available product customization options to vary makeup of the product item that is the subject of the product entry.

* * * * *

UNITED STATES PATENT AND TRADEMARK OFFICE
CERTIFICATE OF CORRECTION

| | |
|---|---|
| PATENT NO. | : 9,619,835 B1 |
| APPLICATION NO. | : 13/297685 |
| DATED | : April 11, 2017 |
| INVENTOR(S) | : Ajay Kumar Sarda et al. |

It is certified that error appears in the above-identified patent and that said Letters Patent is hereby corrected as shown below:

In the Specification

At Column 7, Line 57, replace "343D5E4356AR" with --343DSE4356AR--
At Column 7, Line 61, replace "343D5E4356AB" with --343DSE4356AB--

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*